US006299368B1

(12) United States Patent
Tavularis

(10) Patent No.: US 6,299,368 B1
(45) Date of Patent: Oct. 9, 2001

(54) CORN BUTTERING DEVICE

(76) Inventor: Constandina Tavularis, 17154 Guillaume St., Pierrefonds, Que. (CA), H9J 3T5

(*) Notice: Subject to any disclaimer, the term of this patent is extended or adjusted under 35 U.S.C. 154(b) by 0 days.

(21) Appl. No.: 09/548,787

(22) Filed: Apr. 13, 2000

(30) Foreign Application Priority Data

Apr. 14, 1999 (GB) .................................................. 9908390

(51) Int. Cl.$^7$ .................................................. A46B 11/00
(52) U.S. Cl. .................................. 401/12; 401/11; 118/13; 118/26
(58) Field of Search .................................. 401/12, 11, 9, 401/121, 122, 131; 15/264, 3.1; 118/13, 16, 18, 26, 30

(56) References Cited

U.S. PATENT DOCUMENTS

| 1,571,254 | * | 2/1926 | Foote | ................................... | 401/131 |
| 2,808,020 | * | 10/1957 | Arvidson | ................................. | 118/13 |
| 3,308,269 | * | 3/1967 | Stocker | ................................. | 401/12 |
| 3,316,922 | * | 5/1967 | Seidler | ................................. | 401/122 |
| 5,048,547 | * | 9/1991 | Walker | ................................. | 401/122 |
| 5,308,406 | * | 5/1994 | Wallock et al. | ....................... | 401/10 |
| 5,858,089 | * | 1/1999 | Martinovic | ............................. | 118/13 |

* cited by examiner

Primary Examiner—David J. Walczak
(74) Attorney, Agent, or Firm—Eric Fincham

(57) ABSTRACT

A corn buttering device comprising preferably a cylindrical container having a side wall extending upwardly from a bottom wall with an interior cavity being defined by the bottom wall and side wall, a strip of wiping material for removing butter from an ear of corn being positioned proximate an inlet to the cavity. Butter is placed in the container, melted and then an ear of corn is inserted in the cavity to apply liquid butter thereto with the wiping means permitting removal of excess butter upon withdrawal of the ear of corn.

8 Claims, 3 Drawing Sheets

CORN BUTTERING DEVICE

FIELD OF THE INVENTION

The present invention relates to a butter dispensing apparatus and more particularly, to an apparatus applying a coating of butter or a butter substitute to an ear or cob of corn.

BACKGROUND OF THE INVENTION

Buttering a hot ear of corn can challenge the patience and dexterity of many people. The usual approach calls for using a conventional table knife to cut a piece of butter and attempting to spread the butter over the ear of corn with the knife. As most people understand, the piece of butter is quickly softened or melted by heat from the ear of corn so that the piece of butter becomes awkward to manipulate and spread with a knife. Thus, the piece of butter may slip off the ear of corn leaving a portion of the ear partially unbuttered. Moreover, the butter commonly is unevenly spread over the ear of corn and may be completely missing from part of the ear.

A number of devices specifically designed for buttering corn on a cob are known in the prior art. Such devices are disclosed in U.S. Pat. Nos. 2,811,844; 2,903,997; 3,362,777; 3,736,152; 4,301,762 and 4,408,919.

Many of the devices disclosed in the prior art include means for supporting an ear of corn and/or a piece of solid butter such that the butter is applied to the hot ear of corn by manipulation of the butter holder about the ear or by rotation of the ear of corn in a corn holder. Such devices depend upon the heat of the cooked ears of corn and the melted butter forming a coating on the ear. Inherently, if the ear of corn cools before or during the use of the butter applicator, difficulties are encountered in proper application of butter to the ear of corn.

SUMMARY OF THE INVENTION

It is an object of the present invention to provide an apparatus for applying a coating of butter or a butter substitute to an ear of corn and which device is simple in the construction, easy to use and applies a controlled amount of butter or butter substitute to the ear of corn.

According to one aspect of the present invention, there is provided a corn buttering device which comprises a container having a bottom wall and a side wall extending upwardly from the bottom wall, the side wall terminating in an upper marginal edge, an interior cavity being defined by the bottom wall and the side wall, an inlet to the cavity being defined by the upper marginal edge of the side wall, and wiping means for removing excess butter from an ear of corn, the wiping means being positioned on an interior surface of the side wall proximate the upper marginal edge thereof.

The container portion of the corn buttering device may have any desired configuration although, in a preferred embodiment, the container preferably has a cylindrical side wall which is large enough to accommodate an ear of corn. However, it is naturally within the scope of the invention to have other configurations including, for example, various external features such as an adornment resembling an ear of corn.

The device preferably includes a cover having a handle thereon, the cover being used when heating the container having butter therein. Preferably, the cover will include at least one vent hole.

The container may be made of different materials although it is desirable that it be formed of a non-metallic material for purposes of low thermal conductivity and to permit microwaving thereof.

The device, as aforementioned, includes wiping means for removing excessive butter from an ear of corn, the wiping means preferably being located proximate the upper marginal edge of the container. The wiping means may be suitable with a preferred embodiment comprising a plurality of bristles formed of a suitable material.

BRIEF DESCRIPTION OF THE DRAWINGS

Having thus generally described the invention, reference numerals will now be made to the accompanying drawings illustrating the embodiment of the invention, in which.

DESCRIPTION OF THE PREFERRED EMBODIMENTS

Figure 1:
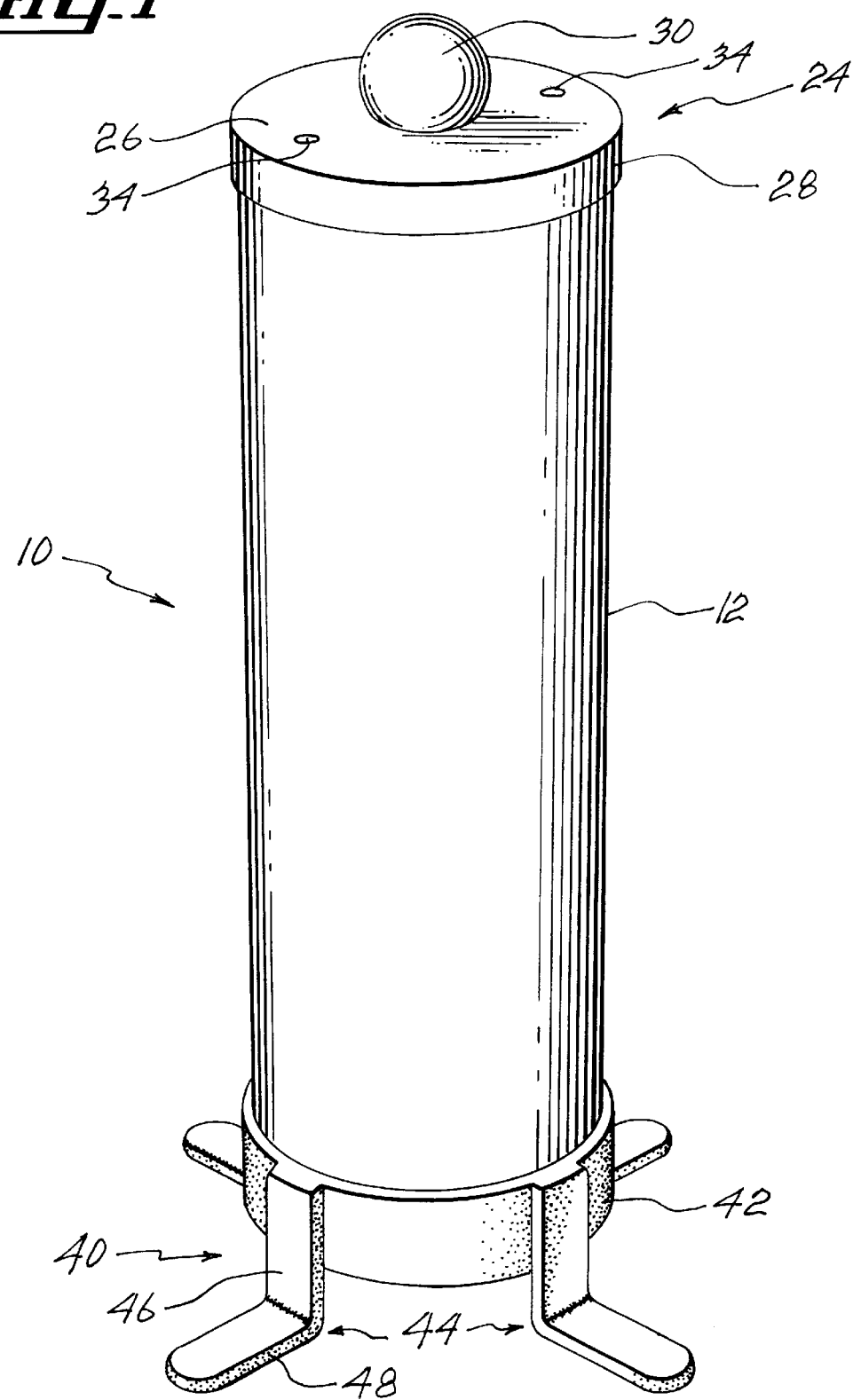
FIG. 1 is a perspective view illustrating a corn buttering device in accordance with an embodiment of the present invention.
Figures 2, 3:
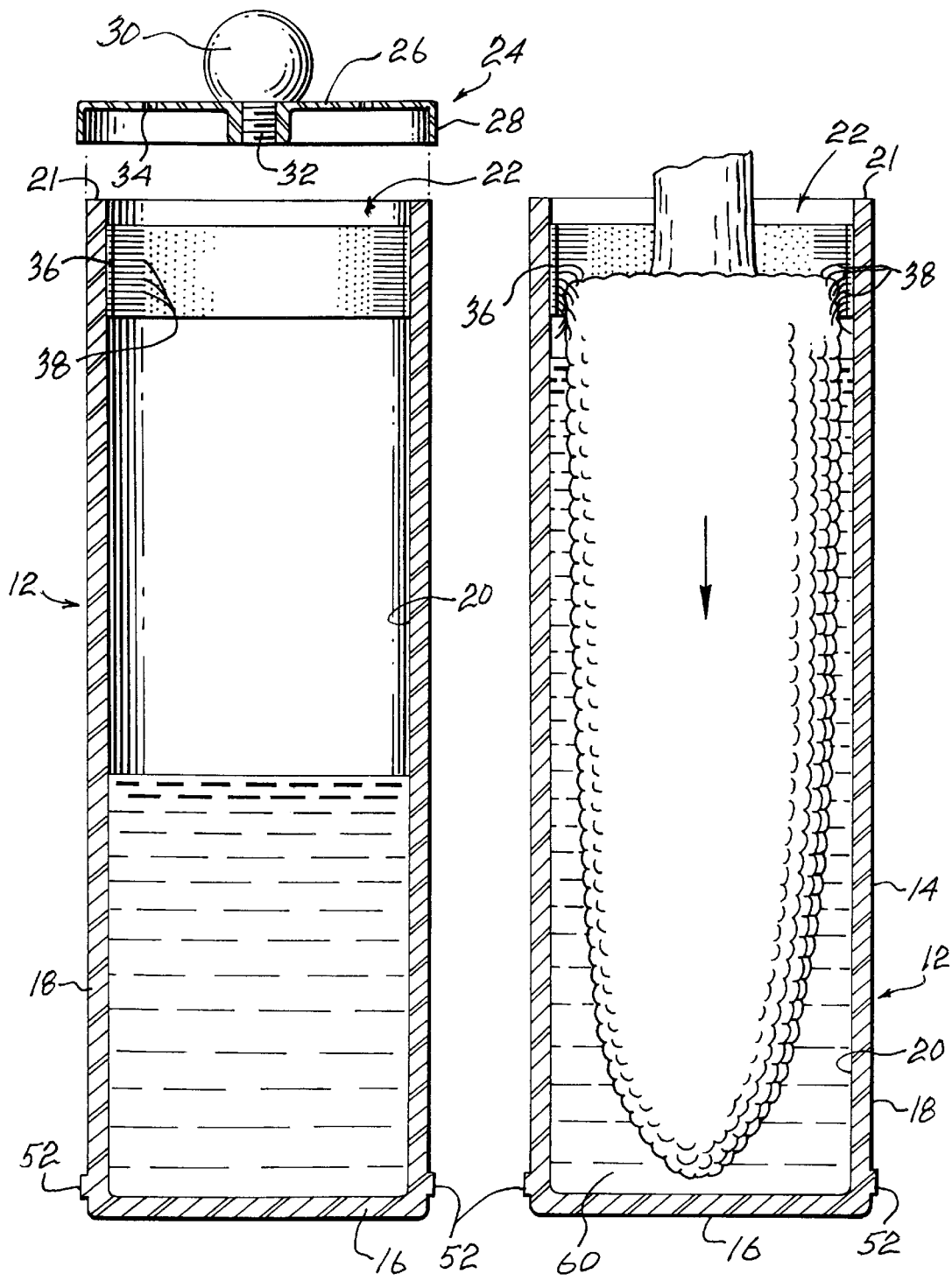
FIG. 2 is a longitudinal cross sectional view illustrating the corn buttering device of FIG. 1 partially filled with butter.
FIG. 3 is a view similar to FIG. 2 illustrating the corn buttering device and having a ear of corn inserted therein.

Referring to FIG. 1, there is shown a corn buttering device 10 in accordance with an embodiment of the present invention. Corn buttering device 10 includes an open top cylindrical container 12 that is configured and sized so as to receive a conventional corn cob 14 as illustrated in FIG. 3. Cylindrical container 12 is defined by a bottom wall 16 and a cylindrical side wall 18 extending upwardly therefrom and terminating in an upper marginal edge 21. Cylindrical container 12 includes an inner cavity 20 and an inlet 22.

As illustrated more specifically in FIGS. 1 and 2, buttering device 10 also includes a cover 24 for closing off the inlet 22. Cover 24 preferably comprises a disc-shaped member 26 having a flange 28 depending integrally downwardly therefrom. In a preferred embodiment of the invention, the cover 24 is provided with a handle or knob 30 releasably mounted to the disc-shaped element 26 by means of threads 32. The disc-shaped member 26 is provided with at least one and preferably two venting apertures 34 extending therethrough. The disc-shaped member 26 and its depending flange 28 are configured and sized so that the flange element 28 frictionally engages the outer surface of the peripheral wall 18 when the cover 24 is placed on top to seal off the inlet 22.

A wiping means is positioned inside the cavity 20 preferably adjacent the inlet 22 for wiping excess butter off from the corn as it is being pulled out of the cavity 20. The wiping means preferably takes the form of a strip of material 36 secured to the inner surface of side wall 18 and having bristles 38 extending outwardly therefrom.

The buttering device 10 also includes a base stand 40. The base stand 40 is specifically designed to support and stabilize the cylindrical container 12 in a perpendicular relationship relative to a supporting surface or substrate. As illustrated more specifically in FIGS. 1 and 5, the base stand 40 includes a base ring 42 having a set of stabilizing legs 44 extending integrally therefrom. Each leg 44 has first vertical segment 46 attached to the ring 42 and a generally horizontal segment 48 for abutting against a supporting surface.

Figure 5:
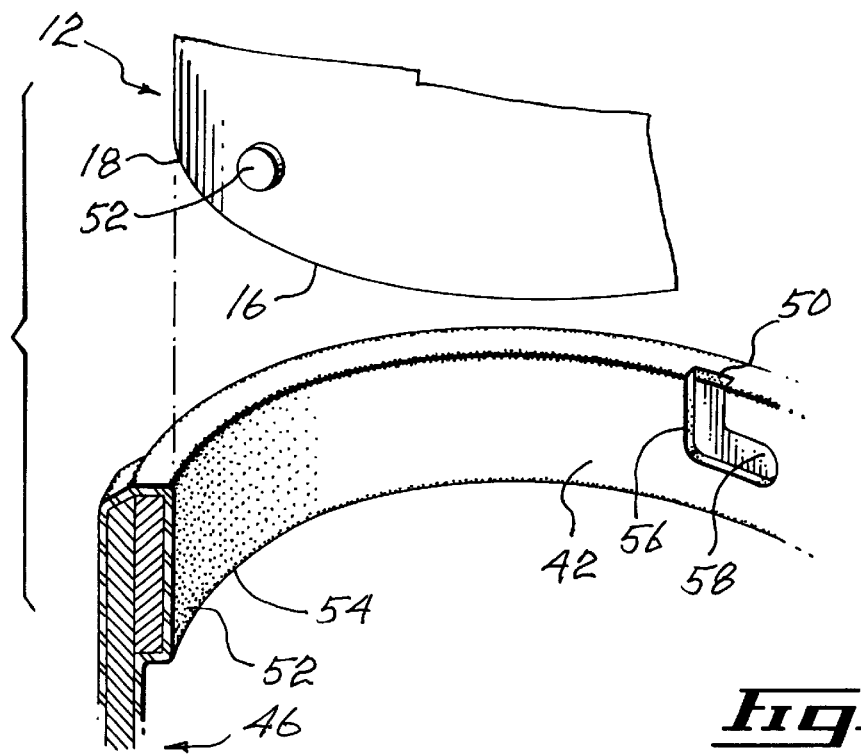
FIG. 5 is a partial perspective view, with sections removed, illustrating the connection between the container and a base stand.

As illustrated in FIG. 5, the base ring 42 has a pair of diametrically opposed L-shaped recesses 50 formed on its inner surface adjacent its upper peripheral edge. The L-shaped recesses 50 are adapted to fittingly receive corresponding protuberances 52 extending integrally and outwardly from the outer surface of the side wall 18 adjacent the bottom wall 16. The combination of the protuberances 52 and of the recesses 50 are thus adapted to provide a releasable locking means for releasably locking the cylindrical container 12 to the base component 40.

In a preferred embodiment of the invention, cylindrical container 12 is made of a microwavable material such as a polymeric resin. Also, cylindrical container 12 is made of a material presenting thermal characteristics such that its low thermal conductivity prevents burning the skin of an intended user even after the cylindrical component 12 has been heated in a microwave oven or any other suitable means.

As illustrated in FIG. 5, in a preferred embodiment of the invention, the base stand 40 has an inner core 52 made of a relatively heavy material such as a metallic alloy and is coated with a layer of relatively ductile material 54 such as an elastomeric resin so as to prevent scratching or damaging of the outer surface of the cylindrical container 12.

It should be understood that the cylindrical container 12 may be given any esthetical appearance such as that of a corn cob without departing from the scope of the present invention.

In use, the cylindrical container 12 is first filled with a block of solid butter or butter substitute. The cylindrical component 12 is then heated in a microwave oven, the cover 24 is maintained over the inlet aperture 22 by the frictional force generated between the flange 28 and the outer surface of the side wall 18. Also, the venting apertures 34 allow through flow of vapors out of the inner cavity 20 and thus prevents potential explosions.

Figure 4:
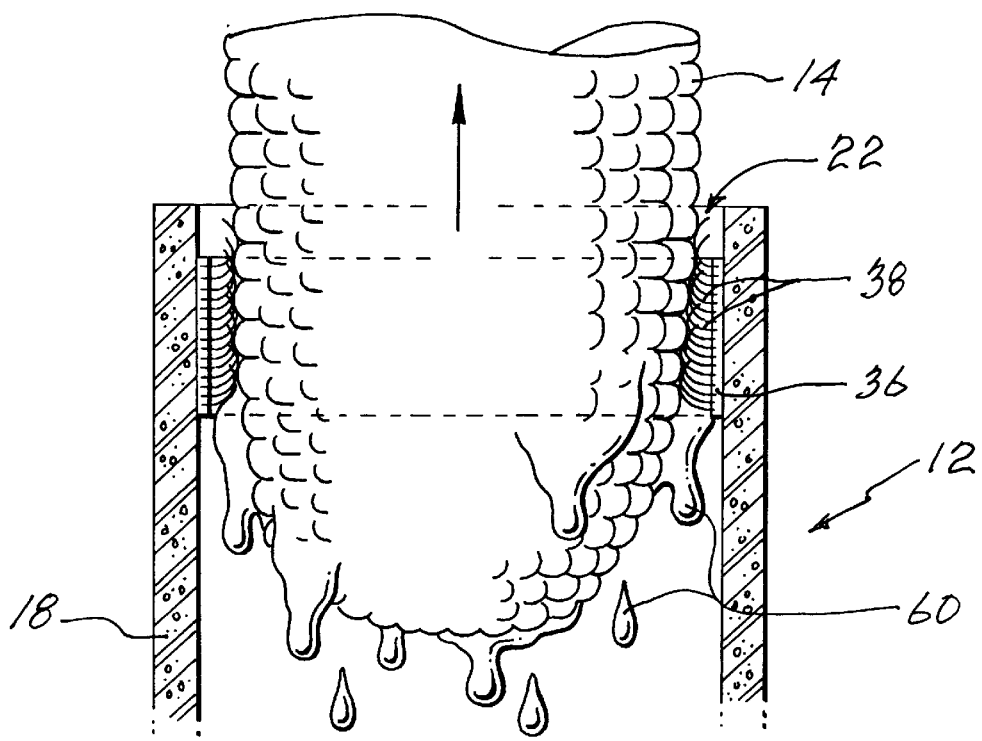
FIG. 4 is an enlarged view of the upper section of the corn buttering device illustrating the wiping section thereof.

Once the butter is melted, the cylindrical container 12 is removed from the microwave oven and preferably connected to the base stand 40 in a generally upright position relative to the working surface. The cylindrical container 12 is releasably locked to the base 40 by sliding the protuberances 52 within the first segment 56 of the L-shaped recess 50 and then pivoting the cylindrical container 12 about its longitudinal axis so that the protuberance 52 slides into the second segment 58 of the recess 50. Corn cob 14 is then inserted through the inlet opening 22 into the melted butter 60 and then pulled out of the cylindrical component 12 while the bristles 38 wipe off excess butter from the outer surface of the corn 14 as illustrated in FIG. 4.

It will be understood that the described embodiment is for purposes of illustration only and that changes or modifications may be made thereto without departing from the spirit and scope of the invention.

I claim:

1. A corn buttering device comprising:
   a container having a bottom wall and a side wall extending upwardly from said bottom wall;
   said side wall terminating in an upper marginal edge;
   an interior cavity being defined by said bottom wall and said side wall, said interior cavity having a height sufficient to receive an ear of corn;
   an inlet to said cavity being defined by said upper marginal edge of said side wall; and
   wiping means comprising a member having a plurality of bristles extending therefrom for removing excess butter from an ear of corn, said wiping means being positioned on an interior surface of said side wall proximate said upper marginal edge, said wiping means extending inwardly a relatively short distance to permit easy insertion of the ear of corn into the cavity and withdrawal thereof.

2. The device of claim 1 further including a cover, said cover being sized to fit over said inlet to said cavity.

3. The device of claim 2 further including at least one vent hole in said cover.

4. The device of claim 2 further including a handle secured to said cover.

5. The device of claim 1 further including a base stand, said base stand being designed to receive and support a lower portion of said container.

6. The device of claim 5 wherein said base stand is formed of a metallic material covered by a polymeric material.

7. The device of claim 1 wherein said container is formed of a microwavable polymeric resin.

8. The device of claim 1 wherein said container is of an elongated cylindrical configuration.

\* \* \* \* \*